Figure 1:
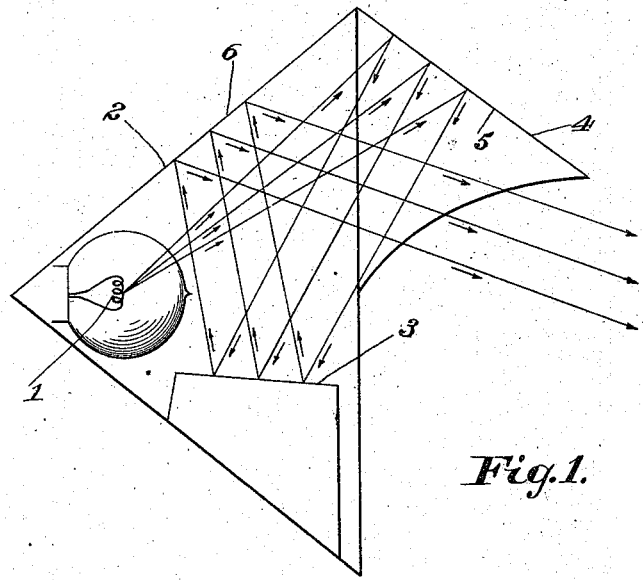

W. W. HOLLAND & G. H. SNYDER.
AUTOMOBILE HEADLIGHT.
APPLICATION FILED AUG. 16, 1915.

1,166,685.

Patented Jan. 4, 1916.
2 SHEETS—SHEET 1.

W. W. HOLLAND & G. H. SNYDER.
AUTOMOBILE HEADLIGHT.
APPLICATION FILED AUG. 16, 1915.

1,166,685.

Patented Jan. 4, 1916.
2 SHEETS—SHEET 2.

WITNESSES.

INVENTORS.

UNITED STATES PATENT OFFICE.

WILLIAM W. HOLLAND AND GEORGE H. SNYDER, OF BALTIMORE, MARYLAND.

AUTOMOBILE-HEADLIGHT.

1,166,685.  Specification of Letters Patent.  Patented Jan. 4, 1916.

Application filed August 16, 1915. Serial No. 45,769.

*To all whom it may concern:*

Be it known that we, WILLIAM W. HOLLAND and GEORGE H. SNYDER, citizens of the United States of America, residing at Baltimore, in the State of Maryland, have invented certain new and useful Improvements in Automobile-Headlights, of which the following is a specification.

The difficulty and danger to which the drivers of automobiles and the public in general are subject due to the glare of the head-lights of these vehicles, is well-known. In the cities, the highways are illuminated and the use of powerful lights is limited or forbidden, but on the country roads, it is necessary to illuminate the path of the vehicle by means of head-lights, and since the introduction of improved automobile lighting systems, fed by an efficient and powerful generator, lights of excessive brilliancy have been used, so that frequently a driver is blinded by the glare of the lights of a passing car and loses control of his machine causing collisions and ditching. Pedestrians and draft animals are also confused by the glare with disastrous results.

Numerous dimmers have been devised, one type of which is controlled by the driver to turn down the light and reduce its intensity temporarily while other machines are passing. Another type is in the form of a screen covering the top part of the reflector to screen the eyes of the drivers of other vehicles and at the same time to allow sufficient light to be thrown on the road. Also, lenses having, or supposed to have, a dimming effect are offered for sale. These expedients are all more or less imperfect. If the lights are temporarily turned down in passing other machines, the driver of the machine provided with this kind of a dimmer must slow down to stop as his eyes are used to a much more intense illumination and when his lights are suddenly dimmed, he is not able to see sufficiently well to continue his course at the same speed under the reduced illumination. The other dimmers, while they are intended to keep the glare out of the eyes without reducing the illuminating effect in the path of the vehicle, in fact, are not largely successful in either intent. The commonest dimmers are those in which the top part of the light is screened. A considerable portion of the difficulty however, comes not from the rays from the top of the reflector, but from the rays which are turned upward from the bottom half of the reflector. These are not intercepted by such a screen and retain this injurious effect.

The object of the present invention is to protect the eyes of passers-by from the glare of the light without loss of illuminating effect. To accomplish this, we provide a vizor or protecting shield at the top having an internal reflecting surface, reflecting means beneath the source of light to turn upward both the direct rays from the source of illumination which are projected downward, and the rays reflected from the internal reflecting surface of the vizor. Both sets of rays from the vizor are then projected forward by contact with a third reflecting surface.

In the accompanying drawings, we have illustrated our invention.

Figure 2:
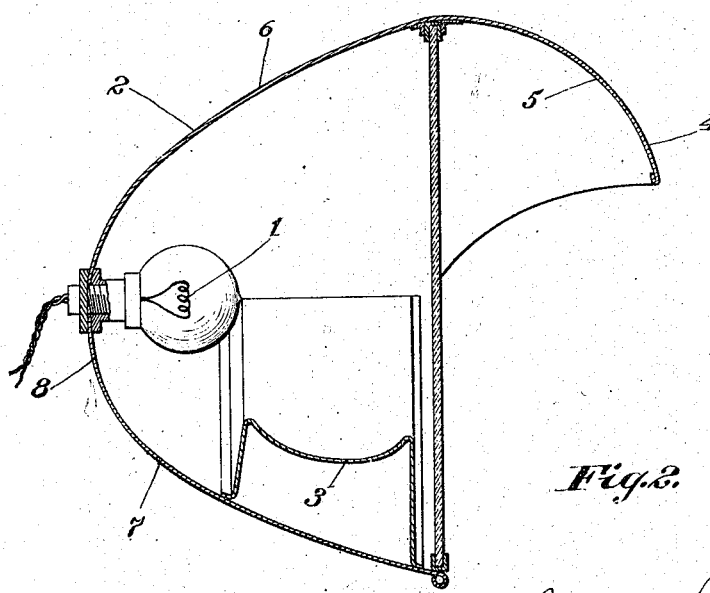
Figure 3:
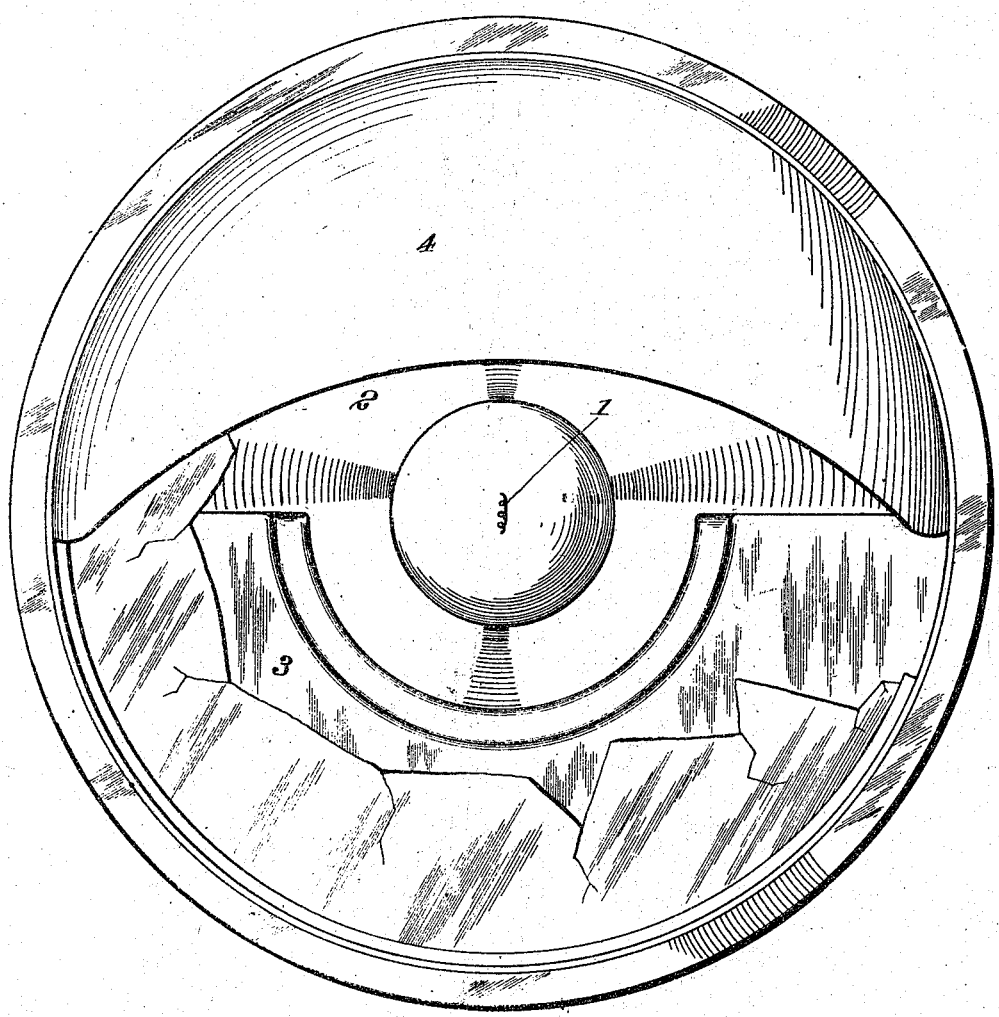

Figure 1 is a diagrammatic view illustrating the arrangement of the reflectors. Fig. 2 is a vertical section through the reflector on the axis. Fig. 3 is a front elevation of a head-light to which the invention has been applied, the glass being broken away to illustrate the reflector.

The device consists of a source of light 1, with reflecting surfaces which may be in a single reflector 2, having in front of and beneath the source of illumination a substantially horizontal upwardly disposed reflecting surface 3, a vizor 4 extending down almost to the level of the source of illumination, with a curved internal reflecting surface 5 adapted to project the rays of light from the source of light and the adjacent portions of the reflector on to the reflecting surface 3, and a reflecting surface 6, preferably almost flat, with its line of intersection in a vertical plane and inclined so as to project the rays from the reflecting surface 3 forward on to the road well in front of the vehicle. Beneath the source of light, the portion of the reflector at 7 is curved or dished so that it is adapted to turn upward to the portion of the reflector 5 all the rays coming from the vicinity of the source of light. At the rear above 8 near the level of the source of illumination, the surface of the reflector is of the usual form, preferably approaching a parabolic curve so that the light rays striking this portion of the reflector from the source of illumination are turned directly forward, giving a bar of light with substantially parallel rays projected forward on to the road surface.

The diagram in Fig. 1 illustrates the theory of operation and the path of the rays reflected directly from the surface 5 of the vizor to the bottom reflector 3 and then up to the reflecting surface 6 from which they are projected forward.

The theory of the invention is that the light coming from the central portion of the part immediately above the center of the usual reflector being projected forward and slightly downward into the road, is not harmful, so we make this portion of our reflector of substantially the usual form. Ordinarily however, a considerable portion of the light which radiates downward from the source of illumination is wasted. Part of it strikes the lower edge of the reflector and is turned upward to be diffused through the atmosphere. These rays are those which most frequently produce the harmful effect on the eyes of passing drivers and pedestrians. Also, a large portion of the light coming directly from the source of illumination is turned downward into the road immediately in front of the vehicle and out of the field of observation of the driver so that it is utterly wasted. To prevent the waste of the upwardly directed rays and to keep them from contact with the eyes of drivers of passing vehicles and the like, we have provided the vizor or shield 4 with the internal reflecting surface 5. This is so placed and formed as to deflect the rays striking it from the source of illumination 1 and from the reflecting surface 7 directly on the reflecting surface 3 by means of which they are projected against the reflecting surface 6 and again projected forward in the form of a beam of substantially parallel rays striking the road directly in front of the vehicle. Also, the rays coming directly from the source of illumination to the reflecting surface 3 are in a large part turned upward to the reflecting surface 6 and projected forward by the action of this part of the reflector.

An important saving is effected by turning the downward rays which strike the reflector 7 upward against the internal reflecting surface 5 of the vizor. Then the rays which are now absolutely useless, if not harmful, are turned forward into the path of the vehicle where it is in full view of the driver.

We have thus described our invention specifically and in detail in order that its nature and operation may be clearly understood; however, the specific terms herein are used in their descriptive rather than in their limiting sense and the scope of the invention is defined in the claims.

We claim—

1. In an automobile head-light, a source of illlumination, a vizor with an internal reflecting surface, an upwardly disposed reflector in front of the source of illumination, and a forwardly and downwardly disposed inclined reflector above the upwardly disposed reflector.

2. In an automobile head-light, a source of illumination, a vizor to intercept the upwardly and forwardly directed rays, the vizor having an internal reflecting surface to project the rays downward, an upwardly disposed reflecting surface to receive the rays from the vizor and project them upward and backward, and an inclined reflector in the path of the rays from the latter-named reflector to receive the rays from that reflector and project them forward.

3. In an automobile head-light, a source of illumination, a vizor to intercept the upwardly and forwardly directed rays, the vizor having an internal reflecting surface to project the rays downward, an upwardly disposed reflecting surface to receive the rays from the vizor and project them upward and backward, an inclined reflector in the path of the rays from the latter-named reflector to receive the rays from that reflector and project them forward, and a curved reflecting surface in the rear of the source of illumination to project the rays directly forward.

4. In an automobile head-light, a source of illumination, a vizor to intercept the upwardly and forwardly directed rays, the vizor having an internal reflecting surface to project the rays downward, an upwardly disposed reflecting surface to receive the rays from the vizor and project them upward and backward, an inclined reflector in the path of the rays from the latter-named reflector to receive the rays from that reflector and project them forward, and a curved reflecting surface extending beneath and slightly in the rear of the source of light shaped to project the rays received thereby on to the reflecting surface of the vizor causing them to follow substantially the same path as that followed by the direct rays which fall upon the vizor.

In testimony whereof we affix our signatures in presence of two witnesses.

WILLIAM W. HOLLAND.
GEORGE H. SNYDER.

Witnesses:
L. J. LUBBEHUSEN,
JAS. PESSAGNO.